United States Patent
Cincea et al.

(10) Patent No.: US 10,197,996 B2
(45) Date of Patent: Feb. 5, 2019

(54) MONITORING OF FIELD DEVICES VIA A COMMUNICATION NETWORK

(71) Applicant: BRISTOL, INC., Watertown, CT (US)

(72) Inventors: Corneliu Cincea, Bistrita-Nasaud (RO); Bogdan Ionut Toporan, Cluj (RO)

(73) Assignee: BRISTOL, INC., Watertown, CT (US)

( * ) Notice: Subject to any disclaimer, the term of this patent is extended or adjusted under 35 U.S.C. 154(b) by 288 days.

(21) Appl. No.: 15/064,456

(22) Filed: Mar. 8, 2016

(65) Prior Publication Data

US 2017/0090467 A1 Mar. 30, 2017

(30) Foreign Application Priority Data

Sep. 29, 2015 (RO) .............. A/00705/2015

(51) Int. Cl.
*G05B 23/02* (2006.01)
*H04L 12/26* (2006.01)
*H04L 12/40* (2006.01)

(52) U.S. Cl.
CPC .... *G05B 23/0205* (2013.01); *H04L 12/40013* (2013.01); *H04L 43/065* (2013.01); *H04L 43/0805* (2013.01); *H04L 43/0817* (2013.01); *H04L 2012/4026* (2013.01); *H04L 2012/40208* (2013.01)

(58) Field of Classification Search
CPC .............. G05B 23/0205; H01L 43/065; H01L 43/0817; H01L 12/40013; H01L 43/0805; H01L 2012/40208
USPC ................................................ 700/9, 11, 310
See application file for complete search history.

(56) References Cited

U.S. PATENT DOCUMENTS 6,499,114 B1 * 12/2002 Almstead ........... G05B 19/4184
399/26
6,665,635 B2 * 12/2003 Shimizu ............. G05B 23/0256
376/215

(Continued)

FOREIGN PATENT DOCUMENTS

WO WO-2014/170002 A1 10/2014

OTHER PUBLICATIONS

International Search Report and Written Opinion for PCT/US2016/054403, dated Jan. 12, 2017.

(Continued)

*Primary Examiner* — Viet Q Nguyen
(74) *Attorney, Agent, or Firm* — Marshall, Gerstein & Borun LLP

(57) ABSTRACT

A system for monitoring field devices operating in process plants includes a remote terminal unit (RTU) coupled to several field devices, each configured to perform a respective function in a process plant, and a host disposed remotely from the RTU and coupled to the RTU via a communication network. The RTU includes (i) a first interface module configured to communicate according to a digital industrial automation protocol, via which the RTU receives data indicative of respective statuses of the field devices, (ii) a memory to store the received data, and (iii) a second interface module configured to communicate with remote hosts via a communication network. The host is configured to (i) request the statutes of the field devices and (ii) receive, from the RTU, indications of the status based on the data stored in the memory of the RTU.

17 Claims, 4 Drawing Sheets

(56) References Cited

U.S. PATENT DOCUMENTS

| | | | | |
|---|---|---|---|---|
| 7,013,345 | B1* | 3/2006 | Brown | H04L 69/16 |
| | | | | 709/223 |
| 7,218,974 | B2* | 5/2007 | Rumi | G05B 13/0275 |
| | | | | 318/561 |
| 7,333,903 | B2* | 2/2008 | Walters | G06Q 30/04 |
| | | | | 315/119 |
| 8,144,028 | B2* | 3/2012 | LaMothe | G05B 23/0221 |
| | | | | 340/870.07 |
| 8,570,922 | B2* | 10/2013 | Pratt, Jr. | H04L 12/66 |
| | | | | 370/310 |
| 9,124,446 | B2* | 9/2015 | Vanderah | H04L 12/4035 |
| 9,202,362 | B2* | 12/2015 | Hyland | G08B 25/08 |
| 9,285,803 | B2* | 3/2016 | Jensen | G05B 23/0256 |
| 9,563,187 | B2* | 2/2017 | Szurek | G05B 15/02 |
| 9,619,984 | B2* | 4/2017 | Donovan | G08B 13/19697 |
| 9,645,907 | B2* | 5/2017 | Sakamoto | G06F 11/3086 |
| 9,825,818 | B2* | 11/2017 | Tiwari | H04L 41/12 |
| 9,869,987 | B2* | 1/2018 | Nakajima | G05B 19/0423 |
| 2005/0007249 | A1* | 1/2005 | Eryurek | G05B 23/027 |
| | | | | 340/511 |
| 2006/0168396 | A1* | 7/2006 | LaMothe | G05B 23/0221 |
| | | | | 711/113 |
| 2006/0218311 | A1* | 9/2006 | Maranat | H04L 67/125 |
| | | | | 710/19 |
| 2007/0280286 | A1 | 12/2007 | Hodson et al. | |
| 2008/0052356 | A1* | 2/2008 | Johnson | H04L 67/12 |
| | | | | 709/204 |
| 2008/0103732 | A1* | 5/2008 | Stoupis | G05B 23/0221 |
| | | | | 702/188 |
| 2009/0240383 | A1 | 9/2009 | Hung | |
| 2010/0199003 | A1* | 8/2010 | Kitamura | G05B 19/0421 |
| | | | | 710/61 |
| 2010/0204959 | A1 | 8/2010 | Thoren et al. | |
| 2011/0215924 | A1* | 9/2011 | Kolblin | G05B 19/0428 |
| | | | | 340/540 |
| 2012/0311181 | A1 | 12/2012 | Smith et al. | |
| 2013/0227575 | A1* | 8/2013 | Jensen | F16K 37/0075 |
| | | | | 718/102 |
| 2015/0156285 | A1* | 6/2015 | Blair | H04L 12/4633 |
| | | | | 709/201 |
| 2015/0277411 | A1* | 10/2015 | Nakajima | G05B 19/0423 |
| | | | | 700/11 |
| 2017/0046239 | A1* | 2/2017 | Konada | G06F 11/3051 |

OTHER PUBLICATIONS

International Preliminary Report on Patentability for PCT/US2016/054403, dated Apr. 3, 2018.

* cited by examiner

MONITORING OF FIELD DEVICES VIA A COMMUNICATION NETWORK

CROSS-REFERENCE TO RELATED APPLICATION

This application is based on and claims the benefit of priority to Romanian Patent Application No. A/00705/2015, entitled "Monitoring of Field Devices via a Communication Network," filed Sep. 29, 2015, the entire disclosure of which is hereby expressly incorporated herein by reference.

FIELD OF THE TECHNOLOGY

The present invention relates generally to process plant systems and, more particularly, to monitoring health of field devices via a communication network using intermediate devices configured to collect device status information and other data from the field devices.

BACKGROUND INFORMATION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller. The process controllers, which are also typically located within the plant environment, receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

A distributed process control system can include one or more remote terminal units (RTUs), which can be implemented as flow computers coupled to field devices. An RTU can include, for example, one or more I/O modules for connecting to wired Highway Addressable Remote Transducer (HART) field devices and one or more I/O modules for connecting to wireless HART field device. More generally, an RTU can support any suitable industrial automation protocol, including such suitable digital industrial automation protocols as HART, Fieldbus or Profibus.

An RTU can operate in a supervisory control and data acquisition (SCADA) network. The SCADA network can be a central or distributed supervisory network or system that connects one or multiple hosts executing software applications for monitoring processes, equipment, variables, etc. with special-purpose devices operating a process control system (or, more generally, an industrial control system). For example, a host that implements an asset management system (AMS) can communicate with one or more RTUs to collect information regarding field devices connected to the RTUs to construct an hierarchy of field devices and provide a description of the hierarchy to an operator via user interface of the AMS. The host also can implement, or be communicatively coupled to, a module that supports an industrial automation protocol for tunneling commands via an RTU to a field device. For example, the host can include a HART server module.

To assess the health of a field device, the host sends a message via the SCADA network and the RTU to the field device, receives the response or detects a timeout, and provides an appropriate indication to the operator via the user interface. In other words, the approach available today is based on directly accessing a field device from a remote host via a communication network. Collecting information in this manner can take several seconds per each field device, with operators experiencing a particularly long delay when a field device is not communicating and the host detects a timeout event. Moreover, this approach generates a large amount of traffic in the network, sometimes interfering with other communications, such as SCADA telemetry data collection.

SUMMARY

A remote terminal unit (RTU) is communicatively coupled to a remote host and field devices that perform respective functions in a process plant. The RTU collects information indicative of the status of the field devices, such as alerts, and stores (or "caches") this information in its local memory. The RTU then provides this information to the remote host upon request via a SCADA network, which can include wired and/or wireless communication links. The remote host can collect the information from the RTU according to a schedule configurable by an operator. In this manner, the number of messages travelling between the remote host and an individual field device is significantly reduced, and status information for multiple field devices can be quickly and efficiently provided to an operator via the user interface of the remote host. Moreover, the host can provide status information for field devices to a third-party software according to the OPC Alarms and Events standard, for example.

One embodiment of these techniques is a method for monitoring status of field devices operating in a process plant. The method includes (i) receiving, at an RTU coupled to a field device, data indicative of a status of the field device, (ii) storing the received information in a memory of the RTU, (iii) receiving, at the RTU from a remote host via a communication network, a request for the status of the field device, and (iv) providing, from the RTU to the remote host in response to the request, an indication of the status of the field device based on the data stored in the memory of the of the RTU.

Another embodiment of these techniques is a system for monitoring field devices operating in process plants. The system includes a remote terminal unit (RTU) coupled to several field devices, each configured to perform a respective function in a process plant, and a host disposed remotely from the RTU and coupled to the RTU via a communication network. The RTU includes (i) a first interface module configured to communicate according to a digital industrial automation protocol, via which the RTU receives data indicative of respective statuses of the field devices, (ii) a memory to store the received data, and (iii) a second interface module configured to communicate with remote hosts via a communication network. The host is configured to (i) request the statutes of the field devices and (ii) receive, from the RTU, indications of the status based on the data stored in the memory of the RTU.

Yet another embodiment of these techniques is an RTU for use in a process plant. The RTU comprises a first interface module configured to exchange data with field devices according to a digital industrial automation protocol, a memory to store data indicative of respective statuses of the field devices, a second interface module configured to communicate with a remote host via a communication network, and a processing module configured to provide, via the second interface module, indications of respective statuses of the field devices based on the data stored in the memory.

DETAILED DESCRIPTION

Figure 1:
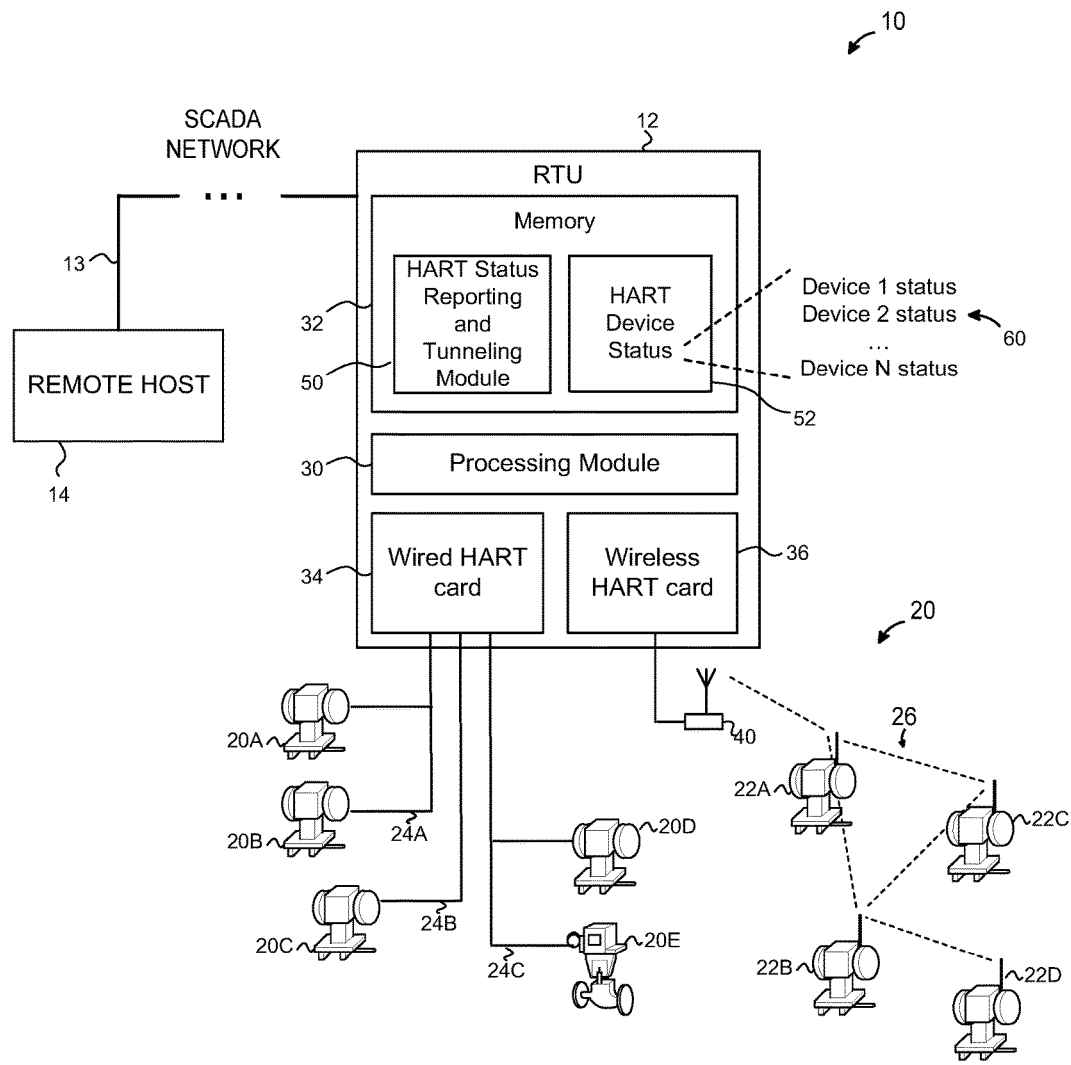
FIG. 1 is a block diagram of a portion of an example process plant or process control system in which an RTU caches status data for field devices and provides the cached data, or information based on the cached data, to a remote host, in accordance with one implementation of the techniques of this disclosure.

FIG. 1 is a block diagram of an example system 10 in which an RTU 12 collects status data from field devices 20 and provides indications of the corresponding statuses to a remote host 14. The field devices 20 can include wired HART devices 20A-20E and/or wireless HART devices 22A-22D. The wired field devices 20A-20E can communicate via wired links 24A-24C. The wireless HART devices 22A-22D operate in a wireless mesh network 26 via multiple communication links between pairs of devices. The field devices 20 may be any types of devices, such valves, valve positioners, switches, sensors (e.g., temperature, pressure, vibration, flow rate, or pH sensors), pumps, fans, etc. The field devices 20 perform control, monitoring, and/or physical functions within a process or process control loops, such as opening or closing valves or taking measurements of process parameters, for example. In addition to the field devices 20, the RTU 12 can be coupled to other remote units such as adapters or gateways to other networks, for example.

The RTU 12 can be coupled to the remote 14 via a SCADA network, which can include wired and/or wireless links such as a link 13. In an example implementation, the SCADA network includes a big data backbone to which multiple hosts, including the host 14, are coupled. These hosts can include operator workstations, databases, data historians, etc.

The RTU 12 can include a processing unit 30, which can include one or several suitable general-purpose processors, microprocessors, or embedded processors. The RTU also includes a memory 32, which can include any suitable persistent and/or non-persistent storage components readable by the processor 30, a wired HART card 34, and a wireless card HART card 36. Each of the cards 34 and 36 can be configured to transmit and receive messages that conform to the HART communication protocol. The RTU 12 can access the wired field devices 20A-20E via the card 34, and wireless field devices 22A-22D via the card 36 and, in at least some of the embodiments, a wireless access point 40.

For simplicity, FIG. 1 illustrates only one host machine, one RTU, and field devices coupled to the RTU via one wired card and one wireless card. In general, however, the system 10 can include additional devices, communication links, and communication networks. For example, the system 10 in some implementations can include access points, gateways to other process plants (e.g., via an intranet or corporate wide area network), gateways to external systems (e.g., to the Internet), human interface (HMI) devices, servers, data systems (e.g., including process databases, historians, etc.), controllers, input/output (I/O) cards operating in controllers, routers, additional wired communication networks, additional wireless communication networks, etc.

The memory 32 can store software and/or firmware instructions, executable on the processor 30, that implement a HART hierarchy reporting module 50. In operation, the module 50 formats and transmits HART commands to the field devices 20, receives responses to the HART commands from the field devices 20, transmits pass-through commands between the host 14 and the field devices 20, and services requests for data received from the host 14. More specifically, the module 50 can cache status information for the field devices 20 in the memory 32 and, upon a request from the host 14, format a message according to a desired format to convey device status information based on the cached data, or simply forward the cached data to the host 14. Example operation of the module 50 is discussed in more detail with reference to FIG. 4. It is noted again that HART devices and HART commands are only one example of a standard for communicating process control information with which the techniques of this disclosure can be used.

The module 50 can store the information about the field devices 20 in HART device satus cache 52, which can be any suitable portion of the memory 32. The cache 52 can be implemented as one or several tables of a relational database or using any other suitable data structures. In an example implementation, the cache 52 stores, for each of the field devices 20, a respective record 60 that indicates the status of the corresponding field device as a HART device status bit mask, for example. More generally, the record 60 can store status data in any suitable format. For clarity, the bits in a HART device status bit mask are illustrated and briefly discussed in Table 1 below. As one of ordinary skill in the art would recognize, the bit mask in each row specifies how the corresponding bit is extracted (e.g., the value 0x84 masked with 0x01 extracts the least significant bit, which is zero, and the same value masked with 0x02 extracts the second least significant bit, which is one), and the definition specifies the meaning of extracted bit when the bit is set.

TABLE 1

| BIT MASK | DEFINITION |
| --- | --- |
| 0x80 | Device Malfunction: the device detected a serious error or failure that compromises device operation. |
| 0x40 | Configuration changed: an operation was performed that changed the device configuration. |
| 0x20 | Cold Start: a power failure or device reset has occurred. |
| 0x10 | More Status Available: more status information is available via command 48, read additional status information. |
| 0x08 | Loop Current Fixed: the loop current is being held at a fixed value and is not responding to process variations. |
| 0x04 | Loop Current Saturated - the loop current has reached its upper (or lower) endpoint limits and cannot increase (or decrease) any further. |
| 0x02 | Non-Primary Variable Out of Limits: a device variable not mapped to PV is beyond its operating limits. |
| 0x01 | Primary Variable Out of Limits: the PV is beyond its operating limit. |

In addition to collecting device status data in response to a command from the host 14, the module 50 or another component operating in the RTU 12 can keep the cache 52 up-to-date with the current information from the devices 20. In general, the RTU 12 can receive status updates initiated by the field devices 20, or periodically poll the field devices 20 for updated information, for example.

Figure 2:
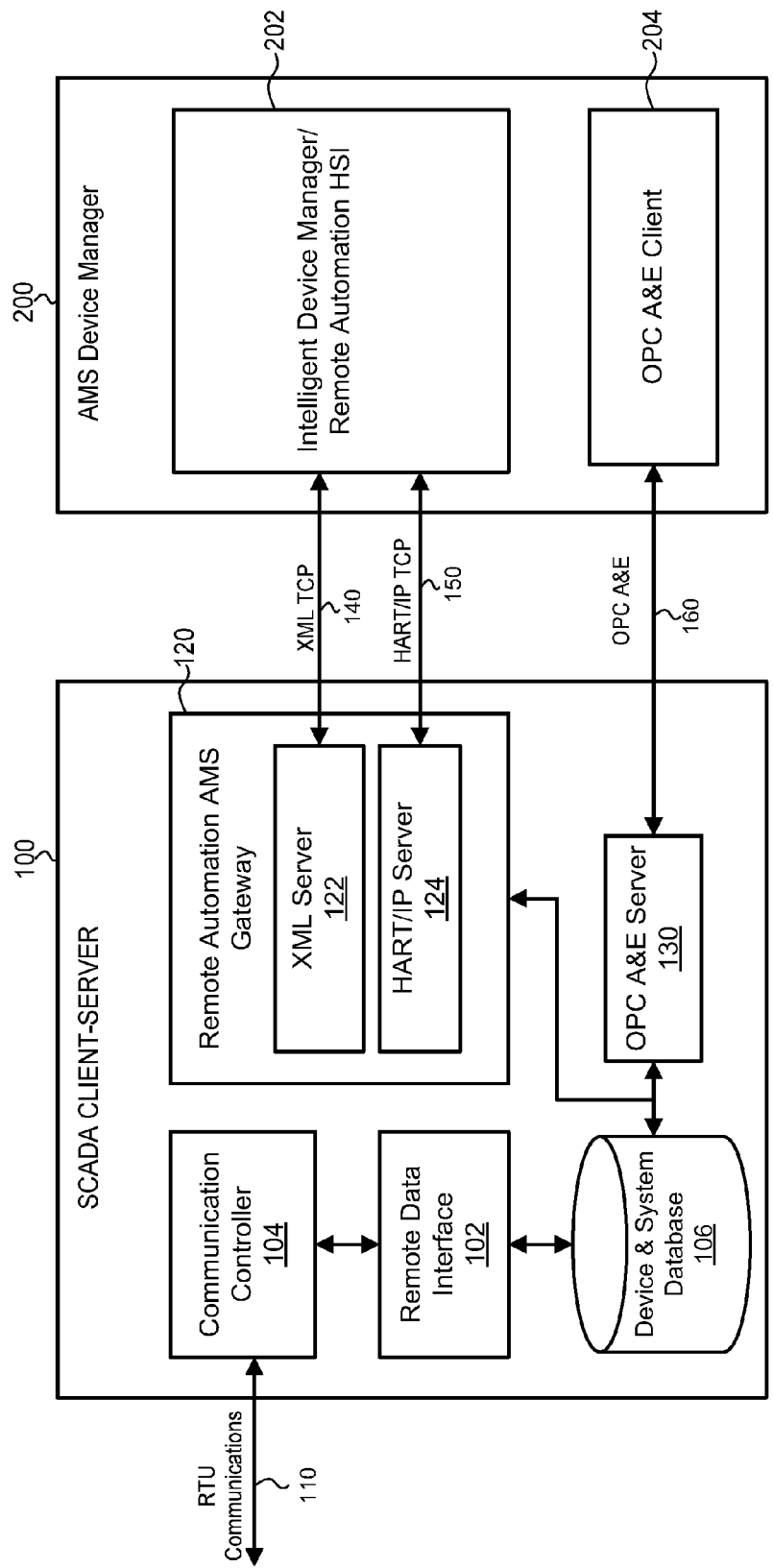
FIG. 2 is a block diagram of an example remote host that can operate in the system of FIG. 1, and an example device manager communicatively coupled to the remote host.

The host 14 can be implemented similar to a SCADA client/server, or simply "host" 100 illustrated in FIG. 2. Now referring to FIG. 2, the server 100 in general is a server and database component that allows for client/server architecture by integrating with certain SCADA clients. The server 100 also supports integration with an AMS service and supports integration with third-party components.

The server 100 can include a remote data interface (RDI) component 102 to communicate with one or several RTUs via a communication link 110, which can be a part of a SCADA network. For example, referring back to FIG. 1, the link 110 can correspond to the link 13, and the server 100 can access the RTU 12 via the RDI 102. The RDI 102 can be configured to periodically collect data from the RTUs according to a certain schedule, such as a predefined poll rate. In some implementations, the server 100 includes multiple instances of the RDI 102, one for each RTU protocol type. Example operation of the RDI 102 is further discussed below with reference to FIG. 3.

The RDI 102 can be communicatively coupled to a communication controller 104 that supports lower-layer communications via the link 110, and to a device and system database 106 can store device hierarchy, last reported status for each field device, etc. The RDI 102 can store newly received status data, including alarms, events, etc. in the system database 106, to be accessed by other components of the server 100 as discussed below. Further, in some cases, the RDI 102 can receive "raw" HART data from an RTU, generate a new alarm or event according to the desired format, and stored the newly formatted alarm or event in the database 106.

The server 100 also can implement a remote automation AMS gateway 120. For example, the gateway 120 can be a part of a Remote Automation Solutions (RAS) product offered by Emerson™ Process Management. The gateway 120 can include an XML server 122 and a HART/IP server 124. The gateway 120 can be communicatively coupled to the device and system database 106. In operation, the XML server 122 can communicate with another module, such as an AMS device manager 200, via XML layered over TCP. The HART/IP Server 124 can communicate HART data to the AMS device manager 200 over a TCP/IP link.

Further, the server 100 can include an OPC Alarms and Events Server 130. The OPC Alarms and Events Server 130 can provide alarms and events to an OPE Alarms and Events client component 204 operating in the AMS device manager 200 via an OPC Alarms and Events links 160. In other words, the server 130 can provide alarms and events data stored in the database 106 to other services and even third-party components using a widely shared industrial standard.

The AMS device manager 200 can include an intelligent device manager/remote automation host system interface (HSI) 202 in addition to the OPC A&E client 204. Using the components 202 and 205, the AMS device manager 200 can provide additional information about assets via appropriate user interfaces.

It is noted that the AMS device manager 200 need not send, receive, and process messages to and from field devices. For example, the AMS device manager 200 need not exchange HART data with field devices: rather, the AMS device manager 200 can access device status information from the database 106, which in turn is populated using data cached at an RTU. In this manner, the overall number of messages transmitted via the SCADA network 13 (see FIG. 1) is significantly reduced.

The components 102, 104, 106, 120 and 130 can be implemented as respective sets of instructions stored in a computer-readable memory and executed by one or more processors. To avoid clutter, the processor(s) and memory are not separately illustrated in FIG. 2. The memory of the server 100 can be any suitable storage medium readable by the one or more processors, and can include persistent and/or non-persistent components. The AMS device manager 200 can be implemented in a similar manner. Depending on the implementation, the server 100 and the AMS device manager 200 can be implemented on a single physical computer host or separate hosts.

Figure 3:
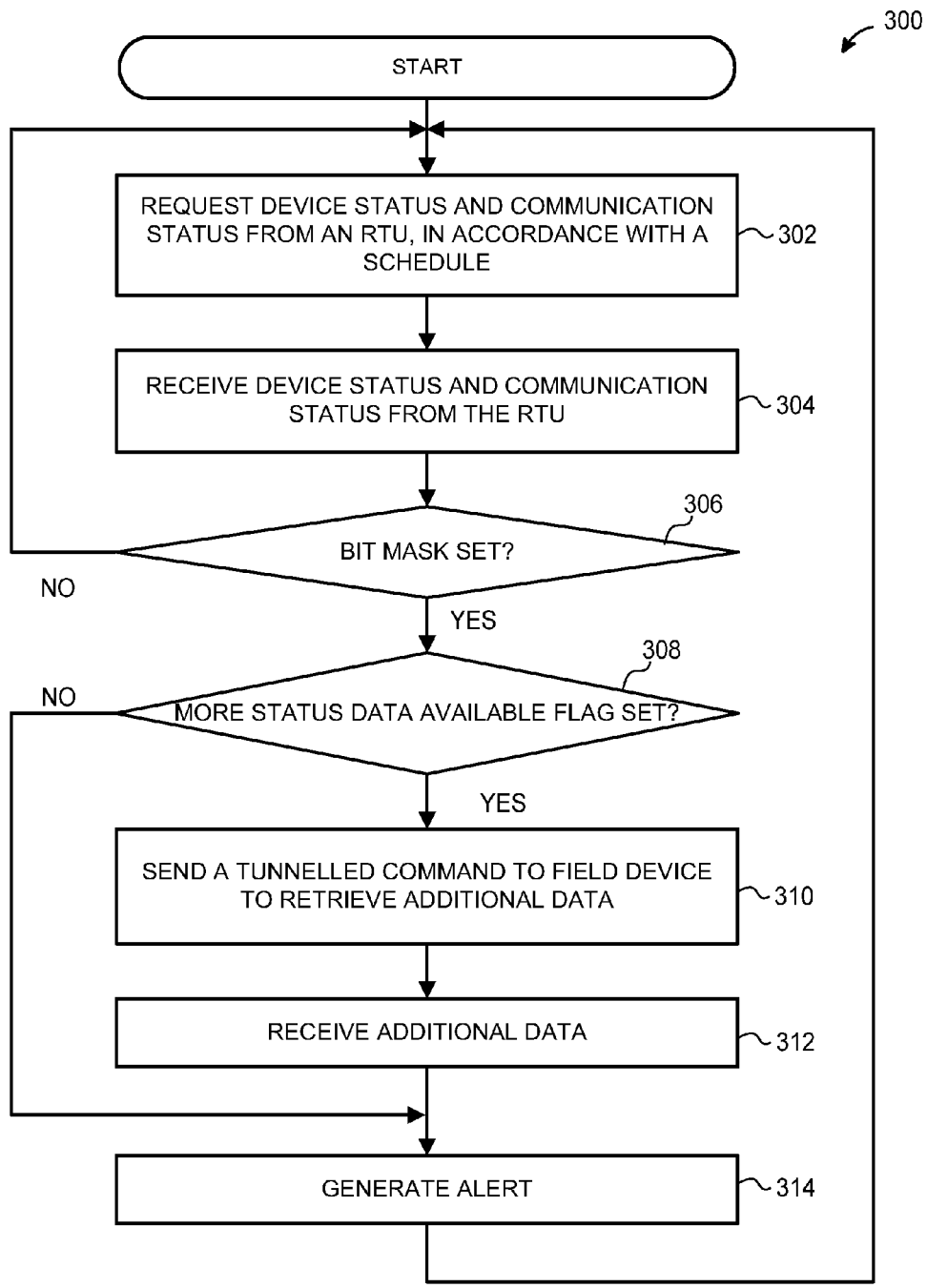
FIG. 3 is a flow diagram of an example method for retrieving status information for field devices according to a configurable schedule, which can be implemented in the example host of FIG. 1 or FIG. 2.

FIG. 3 illustrates is a flow diagram of an example method 300 for retrieving status information for field devices according to a configurable schedule. The method 300 can be implemented in the remote host 14 or in the RDI 102 of the server 100, for example. In general, the method 300 can be implemented in any suitable host or a group of hosts. However, for ease of illustration, this method is discussed below with reference to RDI 102.

The method 300 begins at block 302, where the RDI 102 requests device status by polling the appropriate RTU according to a certain schedule. For example, the RDI 102 can implement a periodic timer and initiate a poll upon each expiration event. As indicated above, the operator can specify the desired polling schedule depending on his or her needs and preferences. Moreover, in addition to configuring the polling schedule, the operator can indicate to the RDI 102 which RTU(s) should be polled when the server 100 can access multiple RTUs as well as which HART devices coupled to an RTU should be polled. Thus, if a certain RTU is coupled to two flow sensors and two temperature sensors, the operator can configure the RDI 102 to specify that the flow sensors should be polled every 10 seconds, while the temperature sensors should be polled every 30 seconds. In this manner, the system of this disclosure can further reduce the number of unnecessary messages transmitted within the SCADA network.

Thus, the request transmitted at block 302 can pertain to all field devices available at the RTU, a specified group of field devices, or a specified individual field device, depending on the implementation.

At block 304, the requested status data for the requested field devices(s) is received. It is noted that, unless the RTU itself is offline, the RDI 102 will not encounter a significant delay due to field devices responding slowly or not at all. In particular, the RTU can determine whether field devices are responding, and what the field devices are reporting, prior to receiving the request from the RDI 102. Thus, the RDI 102 can receive the response at block 304 promptly even when the request pertains to multiple field devices.

According to one example implementation, the RTU contacted at block 302 responds with a bit mask for every field device to which the request pertains. If the bit mask is not set, i.e., if every bit of the bit mask is zero, no information was available for the field device in the cache of the RTU. Accordingly, at block 306, the RDI 102 checks whether the bit mask is set. If the bit mask is set, the flow proceeds to block 308. Otherwise, the flow returns to block 302 (at least for this field device).

At block 308, the RDI 102 checks whether the bit indicative of additional data availability for the field device is set. Referring to Table 1 above, the RDI 102 can apply the mask 0x10. If no more status data is available for the field device, the flow proceeds to block 314. Otherwise, the flow proceeds to block 310.

At block 310, the RDI 102 retrieves the additional information by formatting an appropriate HART command and tunneling the HART command to the field device via the RTU. At block 312, the additional information is received from the RTU.

Next, at block 314, an alarm or event description is formatted using the data received at block 304 and, when applicable, the data received at block 312. As indicated above, the server 100 can provide the alarm or event to the operator via an appropriate user interface, and also make the generated alert or event available to other services, third-party software components, etc. The flow then returns to block 302, where the RDI 102 initiates a new poll according to the schedule.

Figure 4:
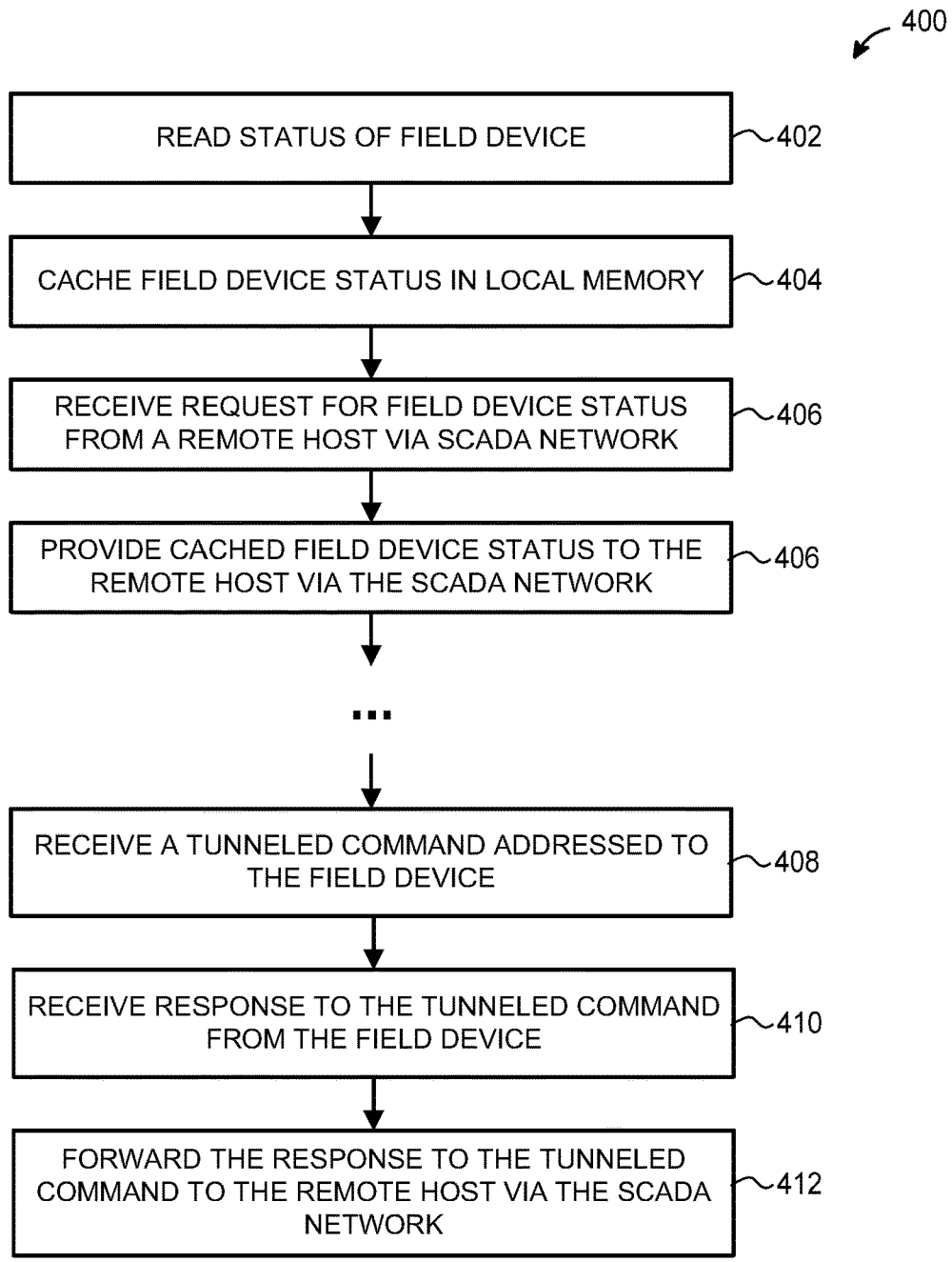
FIG. 4 is a flow diagram of an example method for managing device status using a local memory, which can be implemented in the RTU of FIG. 1.

Now referring to FIG. 4, an example method 400 for managing device status using a local memory can be implemented in the RTU 12 of FIG. 1, or any other suitable RTU. For convenience, the method 400 is discussed below with reference to the RTU 12.

The method begins at block 402, where the RTU reads the status of the field device. To this end, the RTU can transmit a HART command to the field device, the response to which includes a bitmask discussed above with reference to FIG. 1. In other words, the RTU 12 can poll the field device to obtain current status data.

The RTU 12 can then cache the received status data in a local memory a block 404. Next, at block 406, the RTU 12 can receive a request for the status information from a remote host via a SCADA network. In response, the RTU 12 can provide the cached data at block 408. Depending on the implementation, the RTU 12 can provide the cached data according to the format in which the status was received from the field device. In another implementation, the RTU 12 can generate a message according to a different format, based on the cached data.

In some scenarios, the RTU 12 also receives a tunneled command, such as the HART command 48, addressed to the field device (block 408), when the status cached in the memory of the RTU and reported to the remote host indicates that further information is available. The RTU 12 forwards the tunneled command, receives a response (block 410) and forwards the response to the tunneled command to the remote host via the SCADA network (block 412).

General Remarks

From the foregoing, it will be understood that the techniques of this disclosure reduce the number of messages transmitted via a SCADA network to monitor status information of field devices by collecting device status data. In the specific examples discussed above, the RTU caches status information for field devices, and makes it unnecessary in certain situations for the remote host and field devices to directly exchange HART commands/messages. Further, although the examples above primarily pertain to HART devices and HART protocol, similar techniques can be used with other industrial automation protocols in which device status information is reported in a similar manner.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software.

Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for monitoring status of field devices operating in a process plant, the method comprising:
   receiving, at a remote terminal unit (RTU) coupled to a field device, data indicative of a status of the field device;
   storing the received information in a memory of the RTU;
   receiving, at the RTU from a remote host via a communication network, a request for the status of the field device;
   providing, from the RTU to the remote host in response to the request, an indication of the status of the field device based the data stored in the memory of the of the RTU, including providing a bit mask to the remote host;
   checking, at the remote host, a status of the bit mask to determine whether additional information is available; and
   requesting, from the remote host via the RTU, additional information from the field device.

2. The method of claim 1, wherein the request is one of a plurality of requests received at the RTU from the remote host via the communication network, the method further comprising transmitting the plurality of requests according to a schedule configurable by an operator at the remote host.

3. The method of claim 1, wherein requesting the additional information includes tunneling a request to the field device via the RTU.

4. The method of claim 1, further comprising providing, from the remote host, the indication of the status of the field device to a third-party system using a non-proprietary standard.

5. The method of claim 1, further comprising storing, at the remote host, the indication of the status of the field device in a database accessible by a plurality of services.

6. The method of claim 1, wherein the remote terminal unit communicates with the field device via a digital industrial automation protocol.

7. The method of claim 6, wherein the digital industrial automation protocol is HART.

8. The method of claim 1, wherein the communication network is a supervisory control and data acquisition (SCADA) network.

9. A system for monitoring status of field devices operating in process plants, the system comprising:
   a remote terminal unit (RTU) coupled to a plurality of field devices, each configured to perform a respective function in a process plant, wherein the RTU includes:
   a first interface module configured to communicate according to a digital industrial automation protocol, via which the RTU receives data indicative of respective statuses of the field devices,
   a memory to store the received data, and
   a second interface module configured to communicate with remote hosts via a communication network; the system further comprising:
   a host disposed remotely from the RTU and coupled to the RTU via a communication network, wherein the host is configured to (i) request the statutes of the field devices, (ii) receive, from the RTU, indications of the statuses based on the data stored in the memory of the RTU, (iii) check a status of the bit mask to determine whether additional information is available at the corresponding field device, and (iv) request, via the RTU, additional information from the field device.

10. The system of claim 9, further comprising a database to store alarms and events related to the field device, wherein the host is further configured to (i) generate alarms or events based on the received indications and (ii) store the generated alarms or events in the database.

11. The system of claim 9, wherein the host is configured to request the statutes of the field devices according to a schedule configurable by an operator of the host.

12. The system of claim 9, wherein the remote terminal unit communicates with the field devices via a digital industrial automation protocol.

13. The system of claim 9, wherein the communication network is a supervisory control and data acquisition (SCADA) network.

14. The system of claim 9, wherein the RTU periodically polls the field devices to obtain the statuses.

15. A remote terminal unit (RTU) for use in a process plant, the RTU comprising:
   a first interface module configured to exchange data with field devices according to a digital industrial automation protocol;
   a memory to store data indicative of respective statuses of the field devices, the data including respective bit masks reported by the field devices;
   a second interface module configured to communicate with a remote host via a communication network; and
   a processing module configured to:
   provide, via the second interface module, indications of respective statuses of the field devices based on the data stored in the memory in response to commands from the remote host, wherein a status for one of the field devices indicates that further information is available at the corresponding field device,
   tunnel a command from the remote host addressed to the one of the field devices, and
   tunnel a response from the one of the field devices to the remote host.

16. The RTU of claim 15, wherein the processing module is configured to provide the indications of respective statuses in response to commands from the remote host.

17. The RTU of claim 15, wherein the communication network is a supervisory control and data acquisition (SCADA) network.

* * * * *

UNITED STATES PATENT AND TRADEMARK OFFICE
CERTIFICATE OF CORRECTION

PATENT NO. : 10,197,996 B2  
APPLICATION NO. : 15/064456  
DATED : February 5, 2019  
INVENTOR(S) : Corneliu Cincea et al.

Page 1 of 1

It is certified that error appears in the above-identified patent and that said Letters Patent is hereby corrected as shown below:

On the Title Page

At item (57), Column 2, Line 13, "statutes" should be -- statuses --.  
At item (57), Column 2, Line 14, "status" should be -- statuses --.

In the Specification

At Column 2, Line 37, "an hierarchy" should be -- a hierarchy --.  
At Column 3, Line 38, "statutes" should be -- statuses --.  
At Column 3, Line 39, "status" should be -- statuses --.  
At Column 4, Line 52, "human interface" should be -- human-machine interface --.  
At Column 5, Line 9, "satus" should be -- status --.  
At Column 5, in TABLE 1, under "DEFINITION", Line 10, "Saturated -" should be -- Saturated: --.  
At Column 6, Line 29, "OPE" should be -- OPC --.  
At Column 6, Line 63, "illustrates is a flow" should be -- illustrates a flow --.

In the Claims

At Column 10, Line 9, "statutes" should be -- statuses --.  
At Column 10, Line 22, "statutes" should be -- statuses --.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*